(12) United States Patent
Beaudry et al.

(10) Patent No.: US 7,097,232 B2
(45) Date of Patent: Aug. 29, 2006

(54) TRUSS FOR A VEHICLE CHASSIS

(75) Inventors: Hugues Beaudry, St-Jean-Chrysostome (CA); Gregory Richard Delbridge, Mississauga (CA)

(73) Assignee: Prevost Car Inc., Sainte-Claire (CA)

( * ) Notice: Subject to any disclaimer, the term of this patent is extended or adjusted under 35 U.S.C. 154(b) by 0 days.

(21) Appl. No.: 10/934,493

(22) Filed: Sep. 7, 2004

(65) Prior Publication Data

US 2006/0049670 A1    Mar. 9, 2006

(51) Int. Cl.
B60R 5/00    (2006.01)
(52) U.S. Cl. .................... 296/178; 296/205; 296/37.1; 180/311
(58) Field of Classification Search .............. 296/178, 296/184.4, 193.05, 203.01, 205, 203.03, 296/30, 37.1; 180/311
See application file for complete search history.

(56) References Cited

U.S. PATENT DOCUMENTS

| 639,320 | A | | 12/1899 | Vierendeel |
| 4,230,361 | A | * | 10/1980 | Nachbur et al. .............. 296/30 |
| 5,056,848 | A | * | 10/1991 | Fekete et al. ................. 296/63 |
| 5,863,070 | A | | 1/1999 | Williams et al. |
| 5,934,739 | A | * | 8/1999 | Waldeck ..................... 296/178 |
| 6,494,285 | B1 | | 12/2002 | Williams |
| 6,616,217 | B1 | * | 9/2003 | Robinson .................... 296/178 |
| 6,641,206 | B1 | * | 11/2003 | Bergstrom et al. ..... 296/203.01 |
| 6,685,254 | B1 | * | 2/2004 | Emmons et al. ............ 296/178 |

* cited by examiner

Primary Examiner—Jason Morrow
(74) Attorney, Agent, or Firm—Ogilvy Renault, LLP (57) ABSTRACT

The present invention relates to a vehicle chassis having a lower level, an intermediate level, and two lateral sides subject to static and dynamic loads. At least one lateral side comprises a reinforcing truss mounted between the lower and intermediate levels for supporting the static and dynamic loads. The truss includes an upper longitudinal beam mounted at the intermediate level of the chassis; a lower longitudinal beam mounted at the lower level, spaced from and parallel to the upper longitudinal beam; and at least two connecting members extending perpendicularly between the upper and lower longitudinal beams. The connecting members cooperate with the upper and lower beams to define at least one bay having an outline substantially in registry with the outline of the at least one storage compartment.

25 Claims, 6 Drawing Sheets

TRUSS FOR A VEHICLE CHASSIS

BACKGROUND OF THE INVENTION

1) Field of the Invention

The present invention relates to a truss for a vehicle chassis and, more particularly, to a chassis for large vehicles having an opening in one of their lateral sides. It also relates to a method to reinforce a vehicle chassis.

2) Description of the Prior Art

Large motorized vehicles, such as recreational vehicles (RVs), motor homes, and busses, have a chassis on which the body and the mechanical workings of the vehicle, such as the suspension, the motor, and the drive train, are mounted.

An important portion of the bending rigidity (or flexural rigidity) of a conventional vehicle chassis is ensured by a lateral structural truss (FIG. 1) mounted above the passenger floor on each lateral side of the vehicle chassis. The lateral structural truss usually consists of a lower beam mounted at the height of the passenger floor and an upper beam mounted parallel to the lower beam and above the latter. The lower and upper beams are connected with diagonal members. Since the entirety of the lateral structural truss is located above the passenger floor level, the payload volume of the storage compartments located below the passenger floor level is not reduced. For most motorized vehicle users, spacious storage compartments are usually a desired characteristic.

Figure 2:
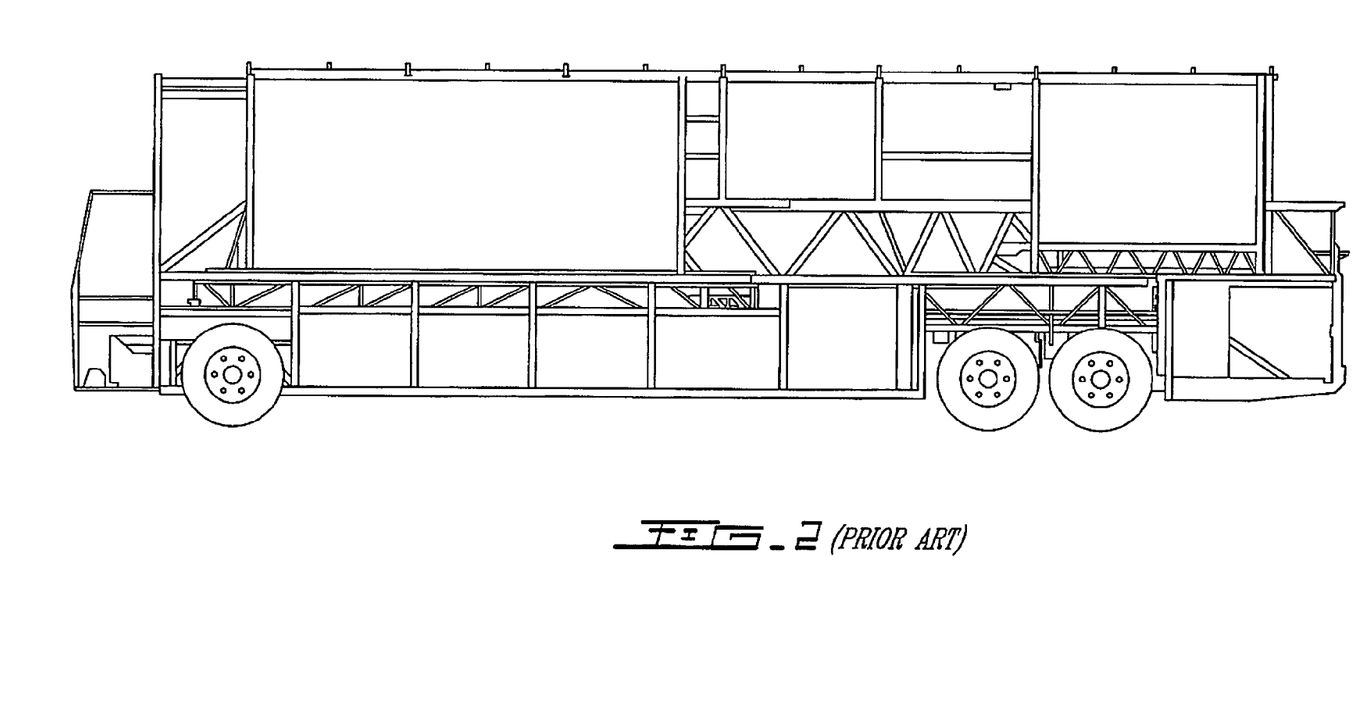
FIG. 2 is a side elevation view of a vehicle chassis of the prior art with an opening in one of the lateral sides of the vehicle.

However, when an opening is created in one of the lateral walls of the vehicle, above the passenger floor, to insert a door, a slide-out compartment and the like, the lateral structure of the vehicle chassis is cut. To maintain the bending rigidity of the vehicle chassis despite the discontinuity of the lateral structural truss, a reinforcing truss is added to the vehicle chassis below the opening. Usually, the reinforcing truss consists of a lower beam and an upper beam connected with diagonal members and is mounted below the passenger floor of the vehicle (FIG. 2) in the storage compartments. In that position, the reinforcing truss considerably reduces the available spacing in the storage compartments and their accessibility. Moreover, this reinforcing truss can only take the stresses applied on the vehicle chassis in a static mode, i.e. when the vehicle is stationary. To reinforce the vehicle chassis when the vehicle is moving, locking mechanisms are mounted to the lateral structure on each side of the opening. These locking mechanisms are usually cumbersome inside the vehicle and increase the manufacturing costs, the vehicle weight, and the complexity to assemble the vehicle.

SUMMARY OF THE INVENTION

It is an object of the present invention to provide a reinforcing truss for a vehicle chassis that allows simultaneously the creation of openings in at least one of the lateral sides of the vehicle chassis and a wide access to the storage compartments.

The present invention provides a vehicle chassis having a lower level, an intermediate level, and two lateral sides subject to static and dynamic loads. At least one lateral side of the chassis comprises an upper longitudinal member mounted at the intermediate level; a lower longitudinal member mounted at the lower level, the lower longitudinal member being spaced from and parallel to the upper longitudinal member; at least two vertical members extending perpendicularly between the upper and lower longitudinal members and cooperating with the upper and lower longitudinal members to define the outline of at least one storage compartment; and a reinforcing truss mounted between the lower and intermediate levels. The static and dynamic loads are supported by the truss. The truss includes an upper longitudinal beam mounted at the intermediate level of the chassis, parallel to the upper longitudinal member; a lower longitudinal beam mounted at the lower level of the chassis, the lower longitudinal beam being spaced from and parallel to the upper longitudinal beam and the upper longitudinal member; and at least two connecting members extending perpendicularly between the upper and lower longitudinal beams. The at least two connecting members cooperate with the upper and lower beams to define at least one bay having an outline substantially in registry with the outline of the at least one storage compartment such as to preserve wide access thereto.

The present invention provides a vehicle chassis having a lower level, an intermediate level, two lateral sides subject to static and dynamic loads, and at least one storage compartment. At least one lateral side of the chassis comprises a reinforcing truss mounted between the lower and intermediate levels. The static and dynamic loads are supported by the truss. The truss includes an upper longitudinal beam mounted at the intermediate level of the chassis; a lower longitudinal beam mounted at the lower level of the chassis, the lower longitudinal beam being spaced from and parallel to the upper longitudinal beam; and at least two connecting members extending perpendicularly between the upper and lower longitudinal beams. The at least two connecting members cooperate with the upper and lower beams to define at least one bay having an outline substantially in registry with the at least one storage compartment such as to preserve wide access thereto.

The present invention also provides a motorized vehicle comprising the vehicle chassis described hereinabove.

The present invention provides a truss adapted to be mounted to a vehicle chassis for supporting the static and dynamic loads applied thereto. The truss comprises an upper longitudinal beam; a lower longitudinal beam, the lower longitudinal beam being spaced from and parallel to the upper longitudinal beam; at least two connecting members connecting the upper and lower longitudinal beams and cooperating with the upper and lower beams to define at least one bay; and at least one reinforcing member mounted inside the at least one bay, at the junction of one of the connecting member and one of the upper longitudinal beam and the lower longitudinal beam.

The present invention also provides a motorized vehicle comprising at least one truss described hereinabove.

The present invention provides a method for supporting the static and dynamic loads applied to a vehicle chassis having a lower level, an intermediate level, two lateral sides subject to the static and dynamic loads, and at least one storage compartment. The method comprises the steps of: providing an upper longitudinal beam and a lower longitudinal beam; providing at least two connecting members, each connecting member having a first end and a second end; mounting the first end of each connecting member to the upper longitudinal beam, perpendicularly thereto, and the second end of each connecting member to the lower longitudinal beam, perpendicularly thereto, thus creating a truss wherein the upper and lower longitudinal beams are parallel to each other, the connecting members and the upper and lower longitudinal beams cooperating to define at least one bay therein; and mounting the truss to the vehicle chassis, the upper longitudinal beam mounted at the intermediate level, the lower longitudinal beam mounted at the lower level, and the at least one bay being substantially in registry with the at least one storage compartment such as to preserve wide access thereto.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 3:
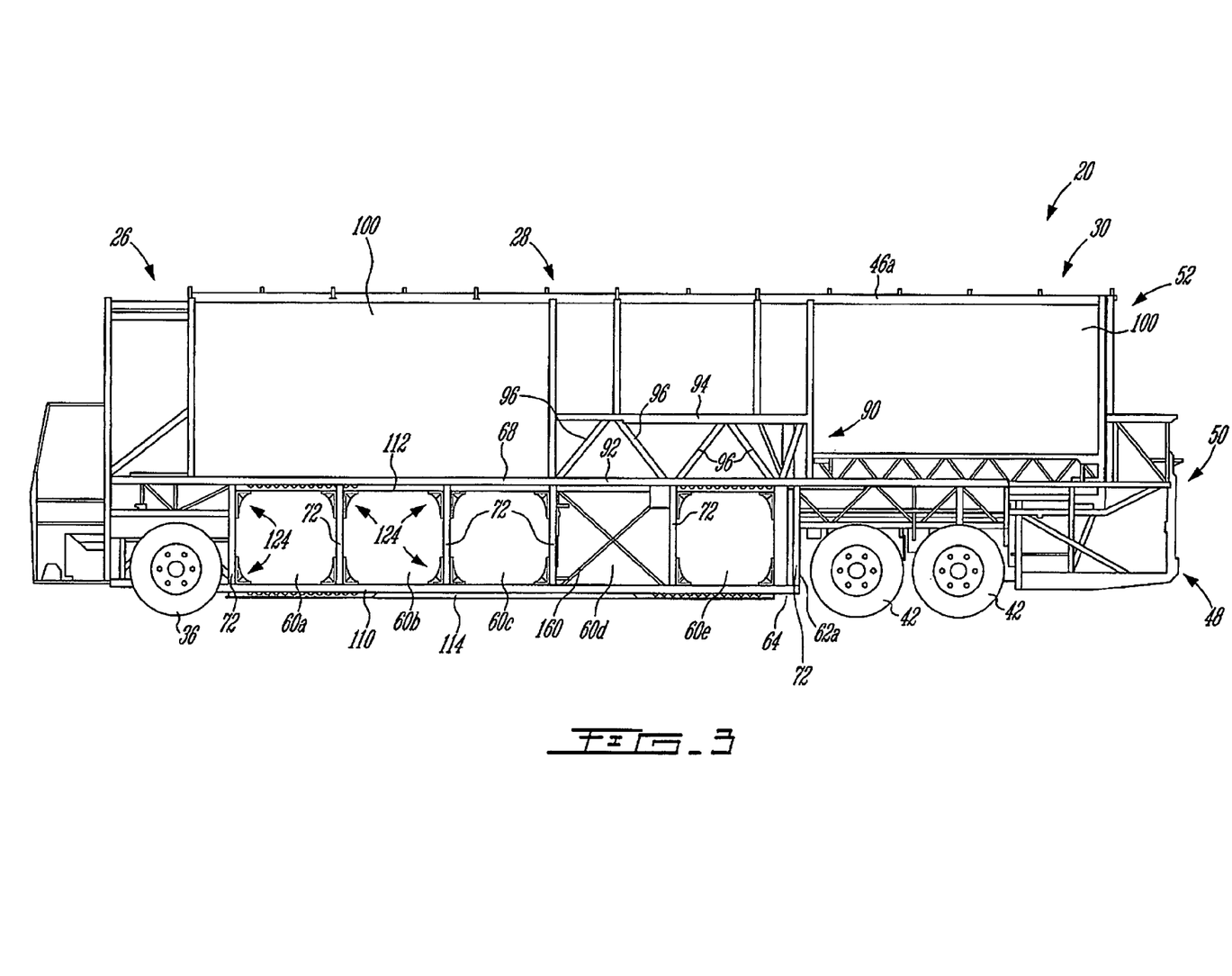
FIG. 3 is a side elevation view of a vehicle chassis including a truss of the present invention mounted thereto.
Figure 4:
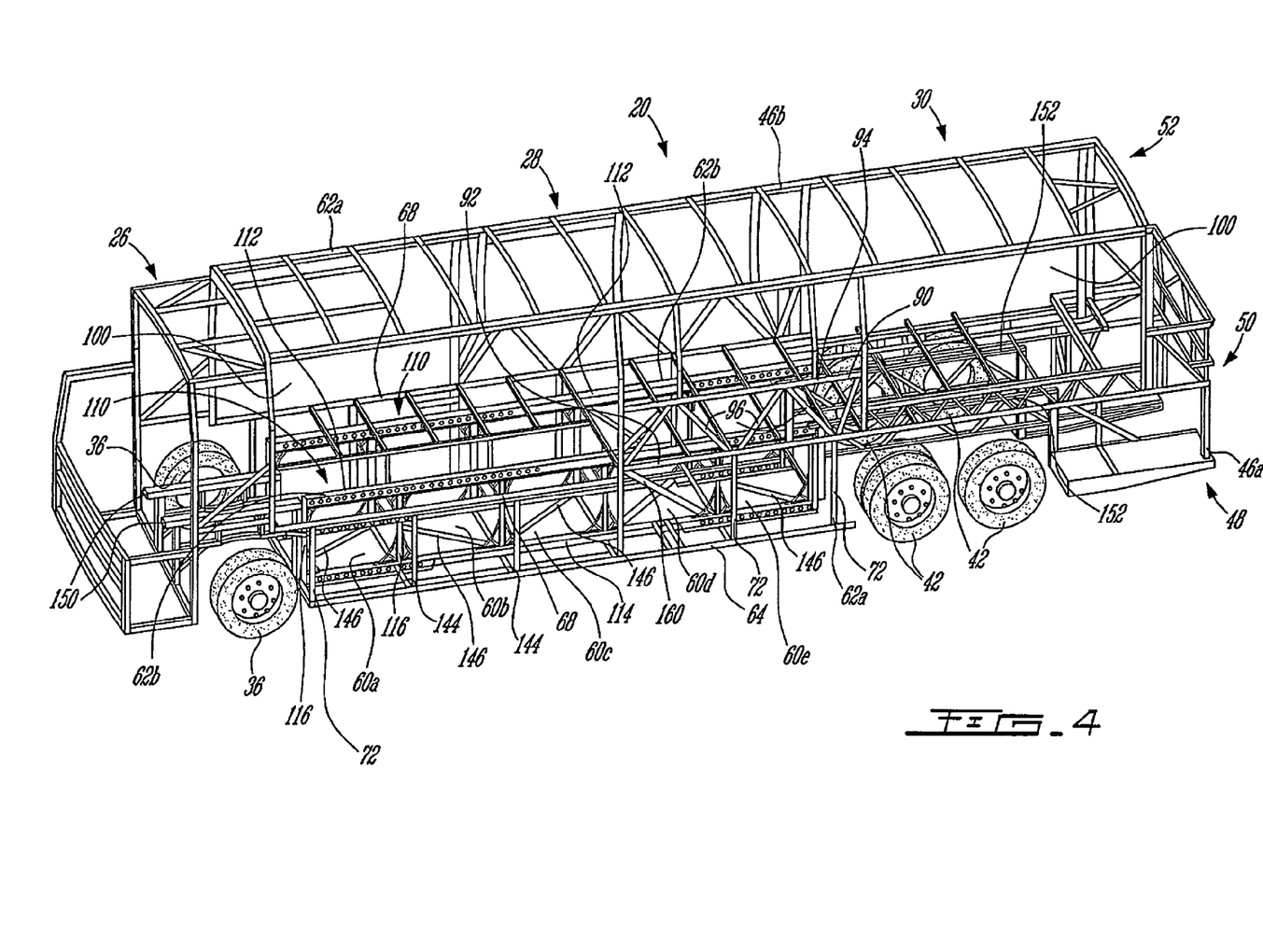
FIG. 4 is a perspective view of the vehicle chassis including two trusses of the present invention mounted thereto.

Referring simultaneously to FIGS. 3 and 4, there is shown an embodiment of a vehicle chassis 20 having a front chassis component 26, a central chassis component 28, and a rear chassis component 30. The delimitation between the front and central chassis components 26, 28 and the central and rear chassis components 28, 30 are respectively the front wheels 36 and the rear wheels 42 of the vehicle.

The chassis 20 has two lateral sides 46a, 46b, parallel to each other, and three levels: a lower level 48, an intermediate level 50, and an upper level 52. The passenger floor (not shown) is mounted at the intermediate level 50 while the roof of the vehicle (not shown) is mounted at the upper level 52. Several storage compartments 60a, 60b, 60c, 60d, 60e are located between the lower level 48 and the intermediate level 50 in the central chassis component 28. A storage floor (not shown) is mounted at the lower level 48. The storage compartments 60a, 60b, 60c, 60d, 60e are usually identical on both lateral sides 46 of the vehicle chassis 20.

For one lateral side 46, the storage compartments 60 are delimited by an outward and an inward storage compartment structures 62a, 62b. As seen in FIG. 4, the outward storage compartment structure 62a of one lateral side 46 of the vehicle consists of a lower longitudinal member 64 and an upper longitudinal member 68, mounted parallel to each other. The lower member 64 is mounted at the height of the lower level 48 while the upper member 68 is mounted at the height of the intermediate level 50. The outward storage compartment structure 62a also includes a plurality of vertical members 72 extending perpendicularly between the lower and upper longitudinal members 64 and 68. In cooperation with the lower and upper longitudinal members 64 and 68, the vertical members 72 define the outline of the baggage compartments 60 of the chassis 20. The inward storage compartment 62b will be described more in details later.

Figure 1:
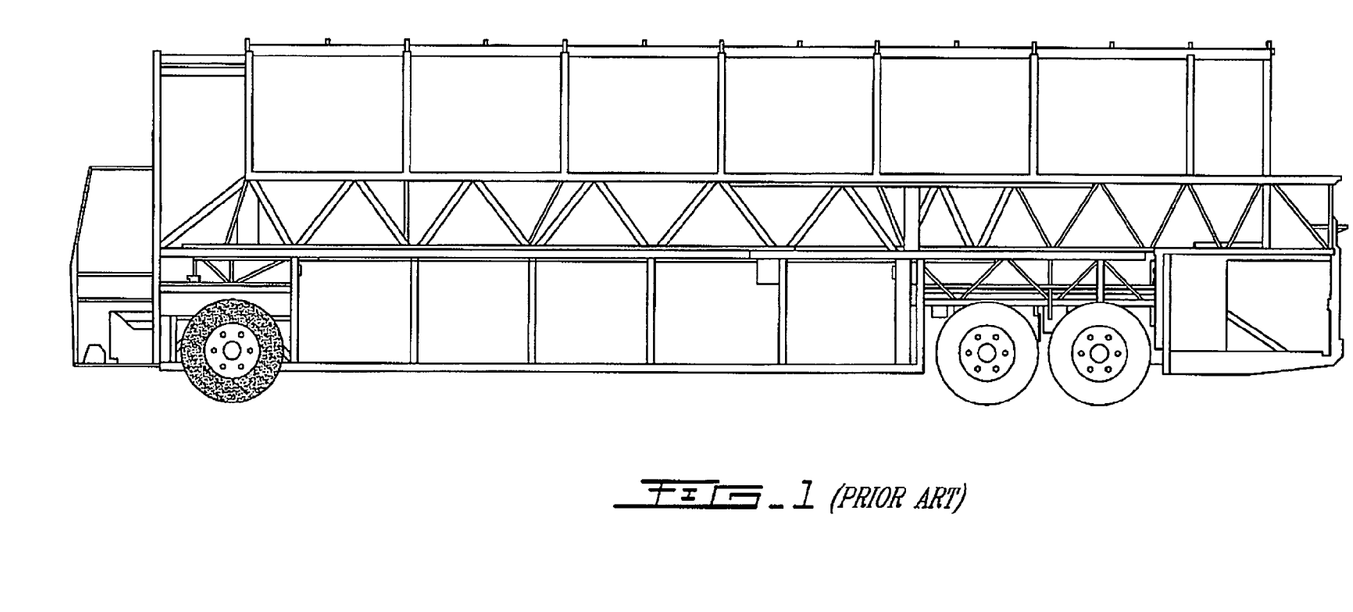
FIG. 1 is a side elevation view of a conventional vehicle chassis without an opening in the lateral sides of the vehicle.

For both lateral sides 46, between the intermediate and upper levels 50, 52, a structural truss 90 is mounted to the chassis 20. The truss 90 includes a lower beam 92 mounted at the intermediate level 50 and an upper beam 94 mounted parallel to the lower beam 92 and above the latter. The lower and upper beams 92, 94 are connected with diagonal members 96. The structural truss 90 is the same than the lateral structural truss 90 that is used in a conventional vehicle chassis (FIG. 1).

On both lateral sides 46 of the vehicle chassis 20 of FIGS. 3 and 4, the structural truss 90 is discontinuous since the lateral sides 46 include two openings 100 located between the intermediate and upper levels, above a portion of the central chassis component 28. As mentioned earlier, an opening 100 in one of the lateral sides 46 requires to reinforce the vehicle chassis 20 below the opening 100 to maintain a predetermined bending rigidity of the latter. One skilled in the art will appreciate that only one lateral side 46 can include one or more openings 100.

A reinforcing truss 110 is mounted inwardly of the outward storage compartment structure 62a. For the chassis shown in FIGS. 3 and 4, the reinforcing truss 110 and the inward storage compartment structure 62b are the same entity. However, one skilled in the art appreciates that the reinforcing truss 110 and the inward storage compartment structure 62b can be different entities as it will be explained more in details later. The reinforcing truss 110 provides to the vehicle chassis 20 the same bending rigidity than a conventional structural truss mounted on a vehicle chassis having no opening 100 in its lateral sides 46.

Figures 5, 5A:
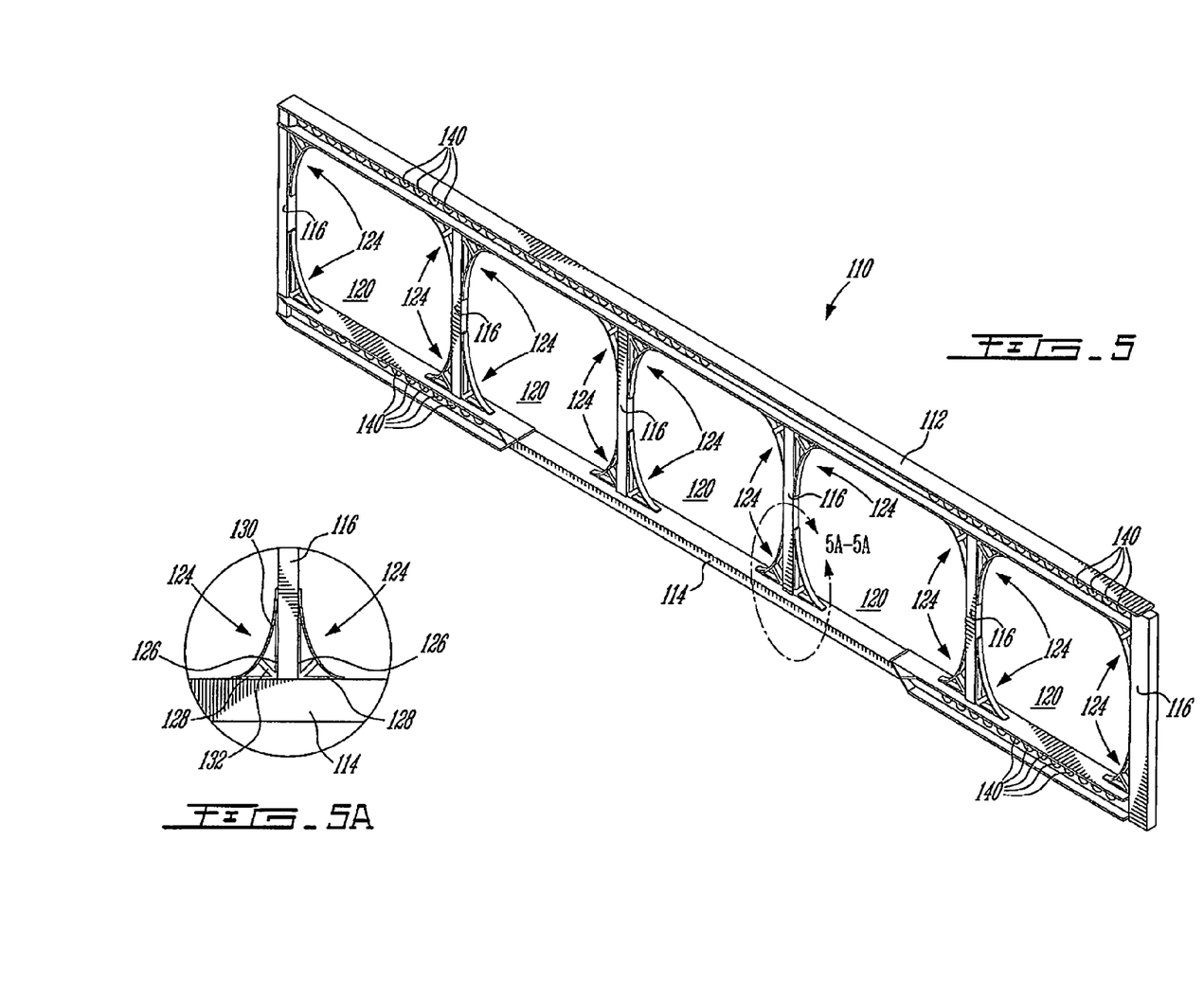
FIG. 5 is a perspective view of a truss according to an embodiment of the present invention, wherein the truss includes reinforcing members.
FIG. 5A is a detail view of an embodiment of the present invention along the line 5A—5A shown in FIG. 5.

Referring now to FIG. 5, there is shown that the reinforcing truss 110 includes an upper longitudinal beam 112 and a lower longitudinal beam 114. The upper and lower longitudinal beams 112, 114 are spaced-apart and parallel to each other. They are connected with a plurality of connecting members 116 that are mounted perpendicularly thereto. The connecting members 116 are welded or secured with any appropriate fasteners to the upper and lower longitudinal beams 112, 114. The connecting members 116 are separated from one another and, in collaboration with the upper and lower longitudinal beams 112, 114, the connecting members 116 define the outline of a plurality of bays 120 in the truss 110. Referring now simultaneously to FIGS. 3, 4 and 5, it will be seen that the bays 120 correspond in cross-section to the compartment compartments 60. The outline of each bay 120 is in registry with the outline of a corresponding storage compartment 60 so as to not reduce reduces the available storage space thereof and allowing an easy access to the storage compartments 60 when the truss 110 is mounted to a vehicle chassis 20.

Reinforcing members 124 are mounted in the corners of the truss 110, in the bays 120, at the junction of one of the upper or the lower longitudinal beams 112, 114 and a connecting member 116. The reinforcing members 124 are preferably provided in the form of a bracket having a first arm 126 mounted on the connecting member 116 and a second arm 128 mounted on the longitudinal beam 112, 114, a transversal arm 130 connecting the extremity of the first and the second arms 126, 128, and a diagonal arm 132 connecting the junction of the first and second arms 126, 128 and the middle of the transversal arm 130. In the embodiment of FIG. 5, the transversal arm 130 exhibits a curved shape. The reinforcing members 124 are cast in a single piece but it is understood that the arms 126, 128, 130, and 132 can be welded or secured with any appropriate fasteners together. The reinforcing members can be welded or secured with any appropriate fasteners to the adjacent connecting member 116 and longitudinal beams 112, 114. One skilled in the art will appreciate that reinforcing members 124 having another shape such as a tube mounted diagonally between one of the upper or the lower longitudinal beams 112, 114 and a connecting member 116, a triangular plate or a rectangular plate can be used.

In the embodiment illustrated, the upper and lower longitudinal beams 112, 114 are I-profiles but one skilled in the art will appreciate that square tubes, rectangular tubes, C-profiles, and the like can be used. Similarly, in the embodiment illustrated, the connecting members 116 are rectangular tubes but one skilled in the art will appreciate that I-profiles, C-profiles, square tubes, and the like can be used.

To reduce the weight of the truss 110 without reducing considerably its bending rigidity, some portions of the upper and lower longitudinal beams 112, 114 can include apertures 140 therein. For example, for a I-profile, apertures 140 can be located in the middle section of both the upper and lower longitudinal beams 112, 114 as shown in FIG. 5. One skilled in the art will appreciate that the apertures 140 can be located on any member of the reinforcing truss 110 such as the connecting members 116.

Referring now to FIGS. 3 and 4, there is shown that a plurality of horizontally extending diagonal members 74 are mounted transversally between the outward storage compartment structure 62a and the reinforcing truss 110. Furthermore, the reinforcing trusses 110 of each lateral side 46 of the vehicle are connected with a plurality of horizontally extending diagonal members 76 mounted transversally between the longitudinal beams 112, 114. The storage floor (not shown) of the vehicle is mounted to the lower longitudinal beams 114 of the reinforcing truss 110.

The upper longitudinal beam 112 is contiguous to the master beams 150, 152 of the front and rear chassis components 26, 30. One skilled in the art will appreciate that upper longitudinal beam 112 and both master beams 150, 152 can be a single beam.

One skilled in the art will appreciate that the chassis can include a distinct inward storage compartment structure 62b from the reinforcing truss 110. The outlines of the compartment structures 62a, 62b and the reinforcing truss 110 are substantially in registry.

One storage compartment 60d of the chassis 20 of FIGS. 3 and 4 is adapted to contain a gas tank (not shown) of a motorized vehicle or any other materiel that does not require a wide access. Therefore, it is not necessary to have a complete access to that storage compartment 60d. The reinforcing members 124 of the truss 110 in that bay 120 are thus replaced with a bracing cross 160 mounted inside the bay 120. The bracing cross 160 enhances the mechanical properties of the truss 110. One skilled in the art will appreciate that the bracing cross 160 can be mounted to any variant of the truss 110. Even if the bracing cross 160 is mounted to the storage compartment 60d in FIGS. 3 and 4, it would be appreciated that it could be mounted to any storage compartment 60.

Figure 6:
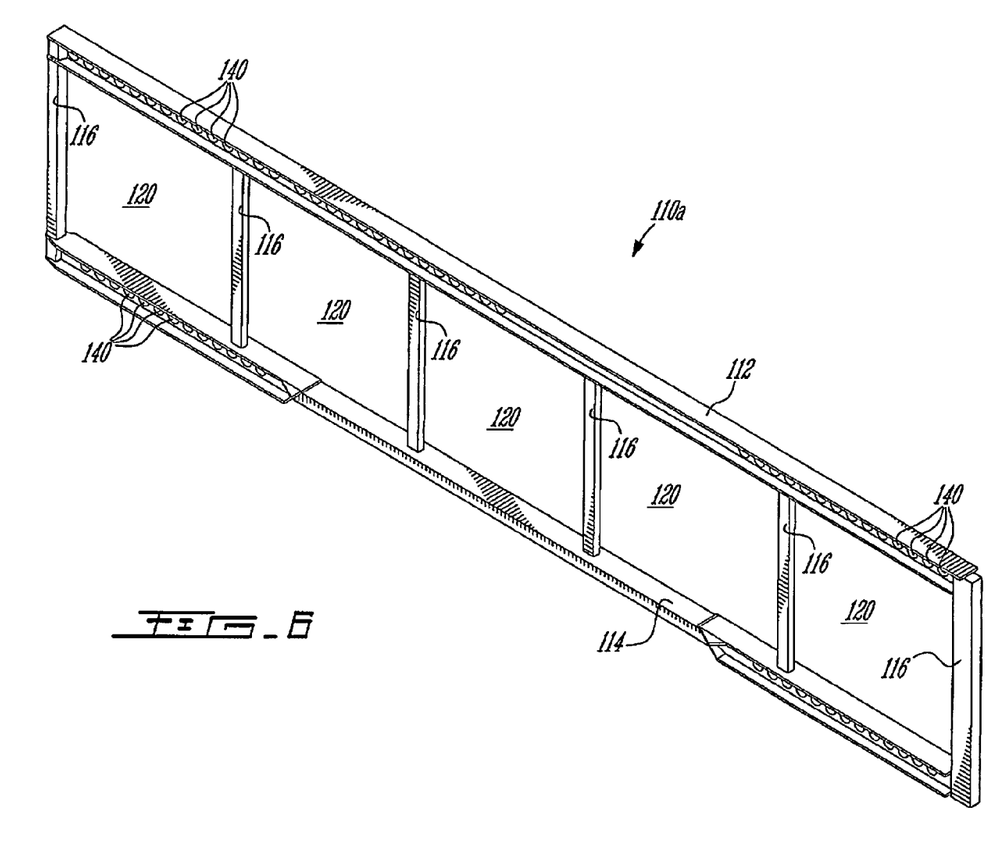
FIG. 6 is a perspective view of a truss according to another embodiment of the present invention.

As shown in FIGS. 5 and 6, the height of the lower longitudinal beam 114 is smaller in its central portion to maintain an acceptable clearance angle for the motorized vehicle. One skilled in the art will appreciate that the lower longitudinal beam 114 can have a uniform height.

Moreover, in the embodiment of FIGS. 3 and 4, the truss 110 is mounted on both lateral sides 46 of the chassis 20 since both lateral sides 46 include at least one opening 100 therein. However, one skilled in the art will appreciate that only one lateral side 46 can include an opening 100 and the truss can be mounted on the lateral side 46 including the opening 100. The other lateral side 46 of the chassis 20 can include either the truss 110 or any appropriate lateral structure known by those skilled in the art that ensures a sufficient rigidity to the chassis 20. For example, the conventional lateral structural truss 90 shown in FIG. 1 can be mounted to the vehicle chassis 20. As shown in FIGS. 3 and 4, if both lateral sides 46 include an opening 100, the truss 110 can be mounted to both lateral sides 46.

There is no limitation to the size of the openings 100 in the lateral sides 46 of the chassis 20. The truss 110 provides sufficient mechanical properties for openings 100 of any length. The truss 110 can be mounted to the whole storage compartment structure 62 or to only a portion thereof (e.g. one or two storage compartments). One skilled in the art will appreciate that the truss 110 is reinforced if it includes more connecting members 116.

In another embodiment (not shown), the truss 110 can be mounted in the position of the outward storage compartment structure 62a described hereinabove. The inward storage compartment structure 62b can be the truss 110 or a structure similar to the outward storage compartment structure 62a previously described. However, one skilled in the art will appreciate that a truss 110 mounted in the position of the inward storage compartment structure 62b provides a higher bending rigidity to the vehicle chassis 20 than one mounted in the position of the outward storage compartment structure 62a.

Referring to FIG. 6, there is shown another embodiment of a truss 110a adapted to be mounted on a vehicle chassis 20 (FIGS. 3 and 4). As the truss 110 described hereinabove, the truss 110a includes an upper longitudinal beam 112 and a lower longitudinal beam 114 that are parallel to each other and spaced apart with connecting members 116 perpendicularly mounted thereto. As for the previously described truss 110, the connecting members 116 are separated from one another and define a plurality of bays 120 in the truss 110a. Some portions of the upper and lower longitudinal beams 112, 114 can also include several apertures 140 therein to reduce the weight of the truss 110a without considerably reducing its mechanical properties. For the embodiment shown on FIG. 6, the ratio of the inertia moment of the upper longitudinal beam 112 and the inertia moment of the lower longitudinal beam 114 is preferably ranging between 1 and 3.

For the truss including reinforcing members (FIG. 5), the ratio of the inertia moment of the upper longitudinal beam 112 and the inertia moment of the lower longitudinal beam 114 can be any value. As for the embodiment shown on FIG. 6, the ratio of the inertia moment of the upper longitudinal beam 112 and the inertia moment of the lower longitudinal beam 114 for the embodiment shown in FIG. 5 is preferably ranging between 1 and 3.

The chassis 20 can be adapted to several motorized or not vehicles such as a bus, a recreational vehicle (RV) of any class (A, B and C), a motor home, a fifth wheel recreational vehicle, and the like.

The truss 110, 110a mounted between the lower and intermediate levels 48, 50 provides the same bending rigidity to the vehicle chassis 20 than the conventional structural truss 90 mounted above the intermediate level 50, either in static or dynamic states. It eliminates the locking mechanisms that were compulsory with the prior art when one of the lateral sides includes an opening therein to insert a door or a slide-out compartment. The truss provides a great flexibility to the size and disposition of the openings in the structure of the chassis. It also reduces the global weight of the chassis. The truss, when mounted to the storage compartment structure, does not reduce the spacing and the access facility to the storage compartment.

The embodiments of the invention described above are intended to be exemplary only. For example, even if the truss is mounted to the storage compartment structure in the embodiments described hereinabove, one skilled in the art will appreciate that the truss can be mounted on any portion of the vehicle chassis. Moreover, the truss can be mounted to a lateral side of a vehicle chassis even if the latter does not include an opening therein. The scope of the invention is therefore intended to be limited solely by the scope of the appended claims.

What is claimed is:

1. A vehicle chassis having a lower level, an intermediate level, and two lateral sides subject to static and dynamic loads, at least one lateral side of said chassis comprising:
   an upper longitudinal member mounted at said intermediate level;
   a lower longitudinal member mounted at said lower level, said lower longitudinal member being spaced from and parallel to said upper longitudinal member;
   at least two vertical members extending perpendicularly between said upper and lower longitudinal members and cooperating with said upper and lower longitudinal members to define the outline of at least one storage compartment; and
   a reinforcing truss mounted between said lower and intermediate levels, a majority of said static and dynamic loads being supported by said bins, said truss including:
   an upper longitudinal beam mounted at said intermediate level of said chassis, parallel to said upper longitudinal member;
   a lower longitudinal beam mounted at said lower level of said chassis, said lower longitudinal beam being spaced from and parallel to said upper longitudinal beam and said upper longitudinal member; and
   at least two connecting members extending perpendicularly between said upper and lower longitudinal beams, said at least two connecting members cooperating with said upper and lower beams to define at least one bay having an outline substantially in registry with the outline of said at least one storage compartment such as to preserve wide access thereto.

2. A vehicle chassis as claimed in claim 1, comprising at least one reinforcing member mounted inside said at least one bay, at the junction of one of said connecting member and one of said upper and lower longitudinal beams.

3. A vehicle chassis as claimed in claim 1, wherein said upper longitudinal beam has a moment of inertia I1 and said lower longitudinal beam has a moment of inertia I2, and wherein I1/I2 is inferior or equal to 3.

4. A vehicle chassis as claimed in claim 1, wherein said truss is mounted inwardly of said upper and lower longitudinal and vertical members.

5. A vehicle chassis as claimed in claim 1, wherein said truss is mounted parallel to said lateral sides.

6. A vehicle chassis as claimed in claim 1, comprising a front chassis component, a central chassis component, and a rear chassis component, each of said front and rear chassis components including a master beam; said truss being mounted to said central chassis component, said upper longitudinal beam being contiguous to said master beams.

7. A motorized vehicle comprising said vehicle chassis claimed in claim 1.

8. A vehicle chassis having a lower level, an intermediate level, two lateral sides subject to static and dynamic loads, and at least one storage compartment, at least one lateral side of said chassis comprising a reinforcing truss mounted between said lower and intermediate levels, a majority of said static and dynamic loads being supported by said truss, said truss including
   an upper longitudinal beam mounted at said intermediate level of said chassis the upper longitudinal beam having a load bearing capacity B1;
   a lower longitudinal beam mounted at said lower level of said chassis, said lower longitudinal beam being spaced from and parallel to said upper longitudinal beam, the lower longitudinal beam having a load bearing capacity B2, similar to the load bearing capacity B1 of the upper longitudinal beam; and
   at least two connecting members extending perpendicularly between said upper and lower longitudinal beams, said at least two connecting members cooperating with said upper and lower beams to define at least one bay having an outline substantially in registry with said at least one storage compartment such as to preserve wide access thereto, the at least two connecting members distributing substantially evenly the static and dynamic loads applied to the truss between the upper longitudinal beam and the lower longitudinal beam.

9. A vehicle chassis as claimed in claim 8, comprising at least one reinforcing member mounted inside said at least one bay, at the junction of one of said connecting member and one of said upper and lower longitudinal beams.

10. A vehicle chassis as claimed in claim 8, wherein said upper longitudinal beam has a moment of inertia I1 and said lower longitudinal beam has a moment of inertia I2, and wherein I1/I2 is inferior or equal to 3.

11. A vehicle chassis as claimed in claim 8, wherein said truss is mounted parallel to said lateral sides.

12. A vehicle chassis as claimed in claim 8, comprising a front chassis component, a central chassis component and a rear chassis component, each of said front and rear chassis components including a master beam; said truss being mounted to said central chassis component, said upper longitudinal beam being contiguous to said master beams.

13. A motorized vehicle comprising said vehicle chassis claimed in claim 8.

14. A truss adapted to be mounted to a vehicle chassis for supporting a majority of the static and dynamic loads applied thereto, said truss comprising:
   an upper longitudinal beam;
   a lower longitudinal beam, said lower longitudinal beam being spaced from and parallel to said upper longitudinal beam;
   at least two connecting members connecting said upper and lower longitudinal beams and cooperating with said upper and lower beams to define at least one bay, the at least two connecting members distributing substantially evenly the static and dynamic loads applied to the truss between the upper longitudinal beam and the lower longitudinal beam; and
   at least four reinforcing members mounted inside said at least one bay, at a respective junction of one of said connecting member and one of said upper longitudinal beam and said lower longitudinal beam.

15. A truss as claimed in claim 14, wherein said at least one reinforcing member comprises a bracket having a first and a second arm, said first arm being mounted to said connecting member and said second arm being mounted to one of said upper longitudinal beam and said lower longitudinal beam.

16. A truss as claimed in claim 14, wherein said upper longitudinal beam has a moment of first inertia I1, said lower longitudinal beam has a moment of inertia I2, and wherein I1/I2 is inferior or equal 3.

17. A truss as claimed in claim 14, wherein said upper and lower longitudinal beams and said connecting members are selected from the group consisting of: I-profile, C-profile, square tube, and rectangular tube.

18. A truss as claimed in claim 14, wherein at least one of said longitudinal beams and connecting members at least one aperture therein to reduce the weight thereof.

19. A motorized vehicle comprising at least one truss as claimed in claim 14.

20. A method for supporting a majority of the static and dynamic loads applied to a vehicle chassis having a lower level, an intermediate level, two lateral sides subject to said static and dynamic loads, and at least one storage compartment, the method comprising the steps of:
   providing an upper longitudinal beam and a lower longitudinal beam;
   providing at least two connecting members, each connecting member having a first end and a second end;
   mounting said first end of east connecting member to said upper longitudinal beam, perpendicularly thereto, and said second end of each connecting member to said lower longitudinal beam, perpendicularly thereto, thus creating a truss wherein said upper and lower longitudinal beams are parallel to each other, said connecting members and said upper and lower longitudinal beams cooperating to define at least one bay therein, the upper longitudinal beam, the lower longitudinal beam, and the at least two connecting members being in a single substantially vertical plane; and
   mounting said truss to said vehicle chassis for supporting the majority of the static and dynamic loads applied to the vehicle chassis, said upper longitudinal beam mounted at said intermediate level, said lower longitudinal beam mounted at said lower level, and said at least one bay being substantially in registry with said at least one storage compartment such as to preserve wide access thereto.

21. A method as claimed in claim 20, further comprising providing at least one reinforcing member; and
   mounting said at least one reinforcing member inside said at least one bay at the junction of one of said connecting member and one of said upper longitudinal beam and said lower longitudinal beam.

22. A vehicle chassis having a lower level, an intermediate level, two lateral sides subject to static and dynamic loads, a front chassis component, a central chassis component, and a rear chassis component, each of said front and rear chassis components including a master beam, and at least one storage compartment, at least one lateral side of said chassis comprising a reinforcing truss mounted to said central chassis component between said lower and intermediate levels, a majority of said static and dynamic loads being supported by said truss, said truss including
   an upper longitudinal beam mounted at said intermediate level of said chassis and contiguous to said master beams;
   a lower longitudinal beam mounted at said lower level of said chassis, said lower longitudinal beam being spaced from and parallel to said upper longitudinal beam; and
   at least two connecting members extending perpendicularly between said upper and lower longitudinal beams, said at least two connecting members cooperating with said upper and lower beams to define at least one bay having an outline substantially in registry with said at least one storage compartment such as to preserve wide access thereto.

23. A vehicle chassis as claimed in claim 3, wherein I1/I2 ranges between 1 and 3.

24. A vehicle chassis as claimed in claim 10, wherein I1/I2 ranges between 1 and 3.

25. A vehicle chassis as claimed in claim 16, wherein I1/I2 ranges between 1 and 3.

\* \* \* \* \*

UNITED STATES PATENT AND TRADEMARK OFFICE
CERTIFICATE OF CORRECTION

PATENT NO. : 7,097,232 B2  Page 1 of 1
APPLICATION NO. : 10/934493
DATED : August 29, 2006
INVENTOR(S) : Hugues Beaudry and Gregory Richard Delbridge It is certified that error appears in the above-identified patent and that said Letters Patent is hereby corrected as shown below:

column 1, line 62: ":" should be --;--
column 7, line 33: "bins" should be --truss--
column 8, line 11: a comma should follow "said chassis"
column 9, line 7: --to-- should be added between "equal" and "3"
column 9, line 26: "east" should be --each--

Signed and Sealed this

Thirteenth Day of March, 2007

JON W. DUDAS
*Director of the United States Patent and Trademark Office*